Aug. 11, 1970     G. P. JOLETTE     3,523,743
DEFLECTOR FOR A CENTRIFUGAL BLOWER

Filed Jan. 16, 1969     2 Sheets-Sheet 1

INVENTOR.
GERALD P. JOLETTE
BY
Woodhams, Blanchard & Flynn
ATTORNEYS

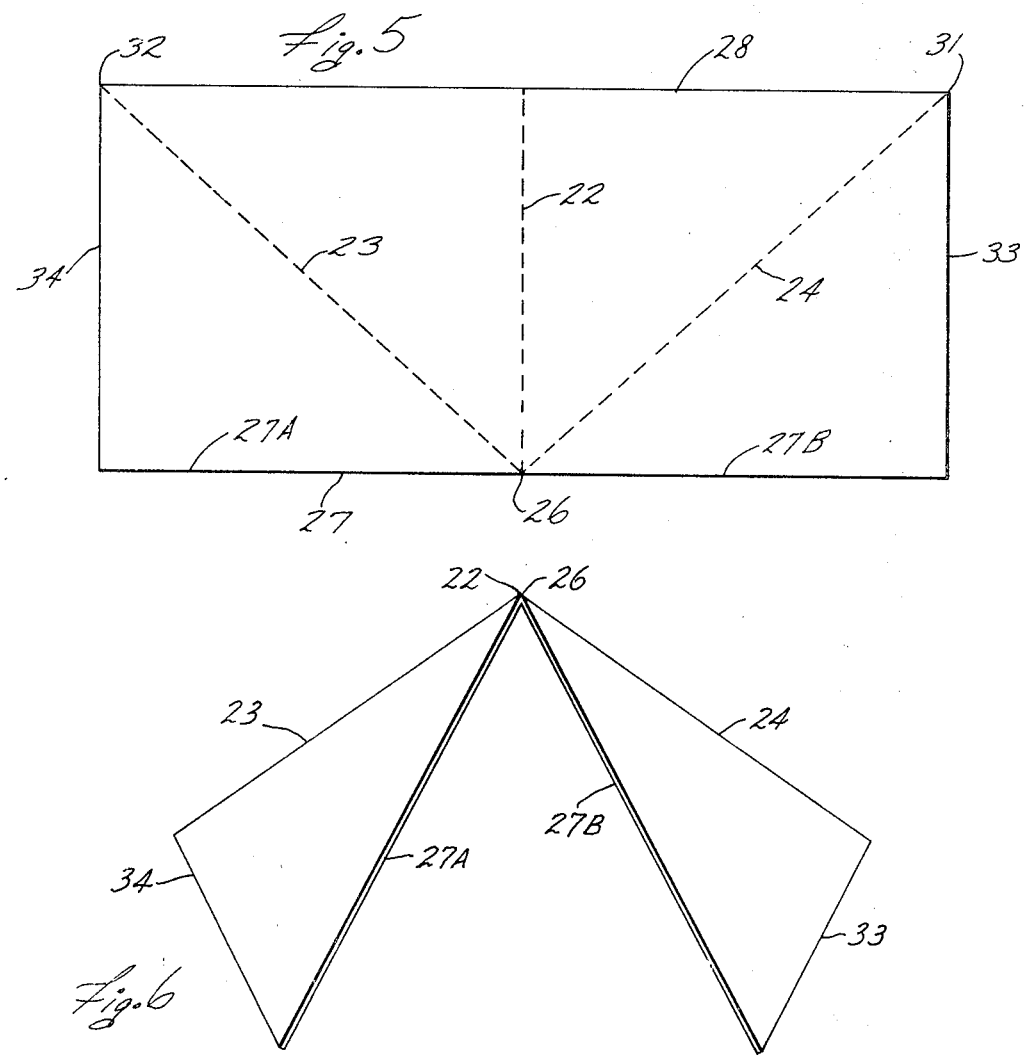

United States Patent Office 3,523,743
Patented Aug. 11, 1970

3,523,743
DEFLECTOR FOR A CENTRIFUGAL BLOWER
Gerald P. Jolette, Kalamazoo, Mich., assignor to The Brundage Company, Kalamazoo, Mich., a corporation of Michigan
Filed Jan. 16, 1969, Ser. No. 791,703
Int. Cl. F04d 17/08, 29/40
U.S. Cl. 415—204        6 Claims

ABSTRACT OF THE DISCLOSURE

In a centrifugal blower wherein the housing is of substantially greater axial dimension than the impeller, this invention provides a deflector structure for placement on an inlet member. This minimizes the otherwise existing tendency for air to circulate around the inlet member in the zone offset from the impeller, whereby the use of such deflector improves the efficiency of the blower unit. The deflector of the invention is a simple rectangular member bent in a characteristic manner and fastened solely to the inlet member.

FIELD OF THE INVENTION

This invention relates to centrifugal blowers and particularly to a deflector for use in a blower having a housing of axial dimension substantially greater than that of the rotor. The deflector is positioned on or at least adjacent the inlet member and serves to prevent air from circulating excessively around said inlet member.

BACKGROUND OF THE INVENTION

For certain types of centrifugal blowers, particularly and primarily those involving reverse bladed impellers, it is customary in the industry for operational reasons to provide a housing having an axial width substantially greater than that of the impeller. A suitable inlet member, usually inwardly tapering, then connects an opening at one side of the housing to the inlet of the impeller at one side thereof and the other side of the impeller in the embodiment here illustrated is placed closely adjacent the other side of the housing. This is a standard construction and has been utilized for many years. In such construction, however, the problem has long existed in that there is a tendency for air to circulate around the inlet member and some part of such air often tends to circulate indefinitely and not be expelled through the blower discharge with consequent decrease in efficiency of the entire unit. This problem has been recognized for many years and many attempts have been made to deal with same, of which U.S. Pat. Nos. 2,452,274, 3,085,741 and 3,221,983 all represent examples.

However, the devices represented by these prior patents as well as others which are known to the industry all involve various features of complexity in their manufacture, their installation, or both, which it is the major object of the present invention to reduce. In some instances, the deflector unit is connected both to the housing and to the inlet member and thus requires at least part of the connecting procedure to be performed after the inlet member is installed in place in the housing; in others the deflector, though installed only on the inlet member, is still a multipiece unit which requires suitable fabrication; and in still others, the deflector unit is used with a separately mounted cutoff member which is normally mounted on the housing and thereby introduces still further complexities into both the manufacturing and use of the blower unit.

Inasmuch as centrifugal blowers are manufactured in very large numbers and under highly competitive conditions, it is desirable that the cost of same be still further minimized without interfering with a high level of operative effectiveness. Accordingly, the objects of the invention include:

(1) To provide a deflector unit as aforesaid, which is of extreme simplicity and which can be applied with a minimum of expense to the inlet member of a blower unit.

(2) To provide a device as aforesaid, wherein the deflector member can be made by simple bending of an initially rectangular piece of metal.

(3) To provide a unit as aforesaid, wherein said bending, as aforesaid, comprises only three bends of less than 90 degrees each.

(4) To provide a device as aforesaid, wherein said deflector member can be easily and efficiently welded to said inlet member.

(5) To provide a device as aforesaid, wherein said deflector can be applied to the inlet member prior to placement of the inlet member into the housing and no further fastening of said deflector to the housing is required.

(6) To provide a device as aforesaid, wherein the same deflector member can be used regardless of the direction of rotation of the impeller.

(7) To provide a deflector as aforesaid, which will be of ample strength and rigidity and will need no servicing or other attention during the normal life of the blower unit.

Other objects and purposes of the invention will be apparent to persons acquainted with apparatus of the general type and upon reading the specification and inspecting the accompanying drawings.

In the drawings:

FIG. 5 illustrates a blank from which the deflector may advantageously be made and showing same prior to the bending thereof.

FIG. 6 is a view of the deflector when bent and ready for installation as viewed from the side thereof appearing at the bottom of FIG. 5.

SUMMARY OF THE INVENTION

Figure 1:
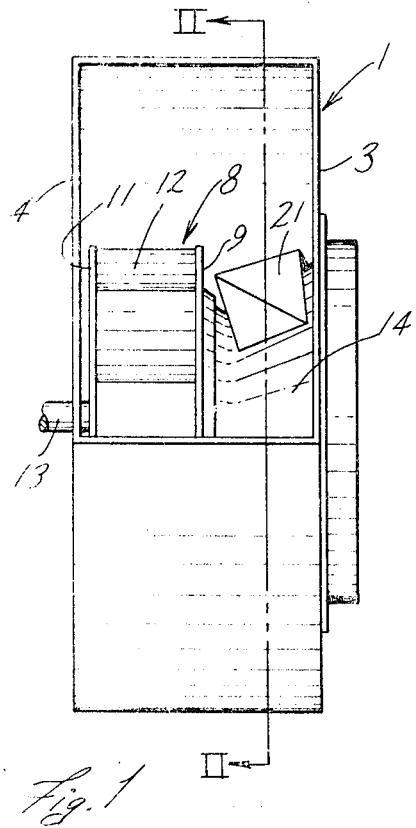
FIG. 1 represents a conventional blower unit of the type referred to with a deflector of the invention fixed in place.
Figure 2:
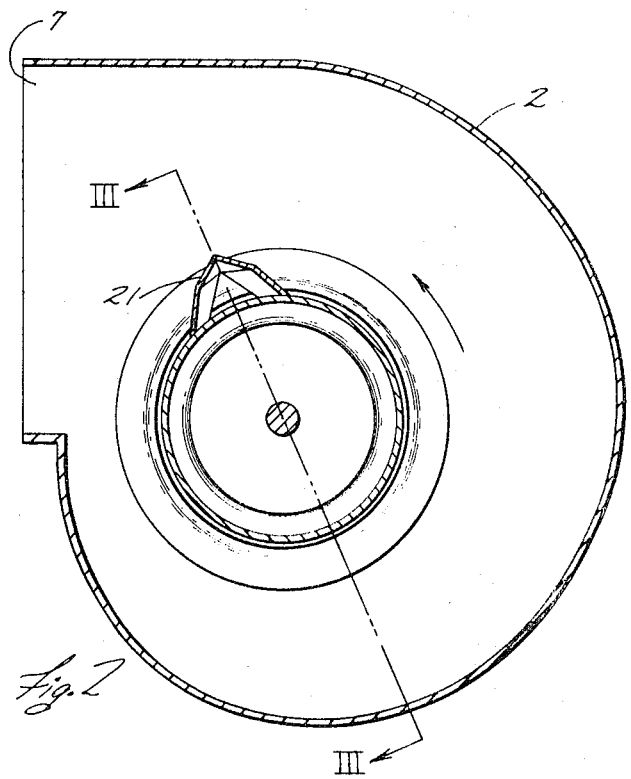
FIG. 2 represents a section taken on the line II—II in FIG. 1.

The invention consists of a simple rectangular plate bent first into a substantially V-shape with the two legs thereof then each bent again in order that the device may be placed onto a somewhat tapering inlet member while the apex thereof remains at least substantially parallel to the axis of the impeller. The device is preferably welded to said inlet member and is fully supported thereby prior to and independently of its installation into the housing. Since the V-shaped deflector is symmetrical, it will operate equally well regardless of the direction of rotation of the impeller.

DETAILED DESCRIPTION

Referring now to the drawings, there is provided a conventional scroll-type housing 1 having a peripheral sheet 2 and sides 3 and 4. The housing is provided with a conventional inlet opening 6 and an outlet or discharge opening 7. The rotor 8 is of conventional construction and in this embodiment has side plates 9 and 11 with a plurality of blades 12 arranged therebetween. In this embodiment, the blades are shown in reverse or trailing position and such is the principal environment within which the invention will be used. However, the direction or positioning of the blades as well as other details of the impeller construction are set forth here only for illustrative purposes and have no limiting significance. The wheel is arranged rotatively within said housing in any conventional manner on a shaft 13. Said shaft is in turn supported for rotative driving in any conventional manner upon bearings (not shown) which are fixed with respect to the sidewalls as desired.

An inlet member 14, often referred to as an "inlet-cone," is usually provided with a mounting flange 16, an inwardly tapering cone section 17 and sometimes, as here, a slightly outwardly flaring inlet end 18 positioned adjacent the inlet of the inlet or eye of the impeller 8. Thus, rotation of the impeller draws air thereinto through said inlet cone and expels same through the discharge opening 7.

All of the foregoing is conventional and well known in the industry and is sufficiently illustrated in each of the above-named patents that no further, or additionally detailed, description thereof is necessary here. Further, the structure thus far described forms no part of the invention excepting as same cooperates with the deflector unit hereinafter described.

The deflector unit 21 is initially of rectangular shape, as shown in FIG. 5, and is then bent first on a line 22 and second on lines 23 and 24. Line 22 is parallel to the short ends of the rectangular blank and midway therebetween. In the particular embodiment here illustrated, the bend on line 22 is through an angle of 70 degrees, that is, the parts after bending form with respect to each other an internal angle of 110 degrees. Lines 23 and 24 extend from the point 26 at which line 22 strikes one long side 27 of the blank to each of the opposite corners 31 and 32 of said blank. The bending on each of lines 23 and 24 is through an angle of 30 degrees whereby the portions on each side of each bend line when said bending is completed bear an internal angle with respect to each other of 150 degrees.

Figure 3:
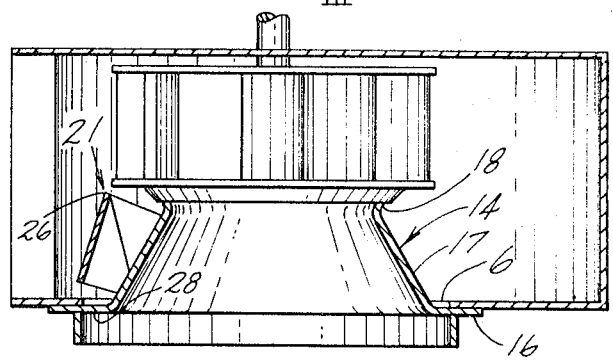
FIG. 3 is a section taken on the line III—III of FIG. 2.
Figure 4:
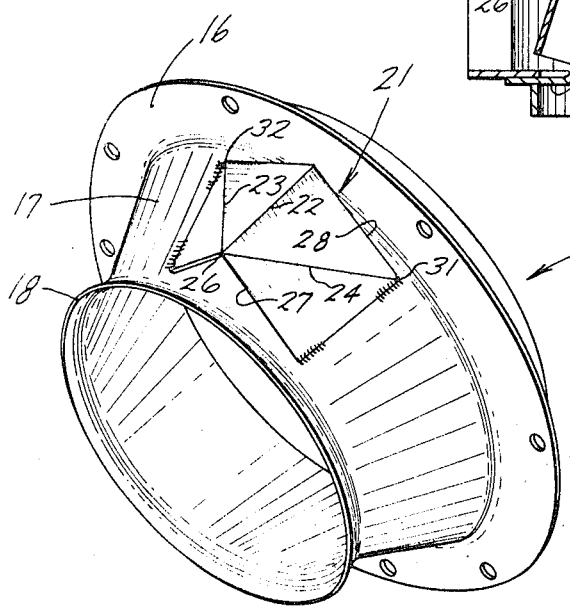
FIG. 4 is an oblique view of the inlet member with the deflector in place.

The part so constructed is then placed onto the inlet cone 14 in the portion 17 thereof, as shown in the drawings, particularly FIG. 3 of same. Inasmuch as the cone is itself made with its central portion 17 of substantially straight-line elements, the rectilinear edges 33 and 34 of the deflector fit snugly thereagainst and can be welded thereto. The deflector is oriented so that the corners 31 and 32 thereof are positioned adjacent the outward end of the inlet cone and the edge 27 is adjacent the inner end of said inlet cone. The deflector is preferably further proportioned and arranged so that the point 26 is at a distance from the center of the inlet cone sufficiently less than the radius of the inlet 6 that said inlet cone with the deflector 21 affixed thereto can be introduced through said opening 6 and thereafter conveniently fastened in place. Further, taking the point 26 as located as far from the center of said cone as possible within the limit provided by the size of the inlet opening, the major length of the blank from which the deflector is made is of sufficient length that the endges 27A and 27B of the side 27 are arranged substantially tangent to the portion of the cone aligned therewith. The edge 22 is not necessarily parallel to the axis of the cone but is aligned in substantially the same general direction. The minor dimension of the blank from which the deflector is made is chosen of a magnitude sufficiently less than the axial length of the cone so that when said deflector is installed in place, its respective edges 27 and 28 will be spaced slightly from the planes defining the respective axial ends of the inlet cone. This is largely for the purpose of convenience in manufacture and installation and has been found not to interfere perceptibly with the operation of the blower unit. Hence, the deflector is effectively operative even though fastened only to the straightline portion 17 of the cone and same can terminate prior to commencement of the curved or flared end portions 36 and 37 (FIG. 3) of the cone.

The deflector being of generally V-shape, it can be readily and quickly welded or fastened in any other convenient manner to said cone and will be stable thereon with each wing thereof supporting the other. Further, said deflector will be equally effective regardless of the direction of rotation of the impeller.

In the foregoing description, the dimensional relationships of the deflector to and with respect to the cone, the tangential positioning of the edges 27A and 27B with respect to the aligned portion of the cone and the magnitude of the angle formed between the parts of the deflector on the respective sides of the lines 22, 23 and 24, are all set forth in their optimum relationship in the drawings and in the foregoing description but none are of critical nature. Thus, variations in all of these relationships may be made as desired so long as the general shape, arrangement and proportions are maintained and so long as the deflector is made as large as possible without restricting the possibility of its being fastened to the inlet cone prior to the installation of the inlet cone into the blower housing.

Further, it should be noted that the foregoing embodiment has shown the central portion 17 of the inlet cone to be comprised of straight-line elements, inasmuch as this makes it possible for the outer edges 33 and 34 of the deflector to describe straight lines. However, if for any reason it is preferable to have the portion 17 of the cone curved, it is entirely feasible appropriately and similarly to curve the ends 33 and 34 of the deflector. This, however, slightly increases the expense of the resulting product.

Although the foregoing description and the accompanying drawings have utilized a single-width-single-inlet blower to illustrate the invention, it will be understood that the same principles and construction for the inlet member and the deflector may be applied also to a double-width-double-inlet blower.

Likewise, the location of the deflector 21 around the circumference of the inlet member 14, though illustrated in a preferred position, may be moved circumferentially as desired without departing from the scope of the invention.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a centrifugal blower for a gas having:
    (a) a housing with substantially parallel sides and a scroll-shaped periphery, a side inlet and a peripheral outlet,
    (b) an impeller having substantially parallel sides and a plurality of blades arranged therein, said impeller being of substantially less axial dimension than the corresponding dimension of the housing,
    (c) means for rotatively supporting said impeller within said housing, and
    (d) a tapered inlet member extending from the side inlet of said housing to a point adjacent the inlet or eye of said impeller, the improvement comprising:
        a generally V-shaped deflector member mounted on said inlet member with its apex remote from the center thereof and of axial length sufficient to constitute a substantial interference with a flow of gas around said inlet member to constitute means for reducing circulation of said gas around said inlet member.

2. The device of claim 1, wherein the free edges of said V-shaped deflector member are positioned closely adjacent the tapered surface of said inlet member throughout at least the major portion of their axial length.

3. The device of claim 1, wherein the free edges of the arms of said deflector are substantially rectilinear and wherein at least a portion of said inlet cone is comprised of substantially rectilinear elements whereby the free edges of said deflector can fit closely against at least a portion of said inlet cone.

4. The device of claim 1, wherein said deflectors if formed from a substantially rectangular blank having a straight-line bend comprising its apex and wherein each side of said deflector is provided with an additional bend, each said additional bend extending from the inner end of said apex to the outer end of each free edge whereby said deflector can accommodate itself to the taper of the inlet cone while maintaining its apex in an alignment at least approximately parallel to the axis of said cone.

5. The device defined in claim 4, wherein at least the outer edges of the respective sides of said deflector are positioned substantially tangent to the portion of the cone in alignment therewith.

6. The device defined in claim 1, wherein the apex of said deflector does not extend further from the center of said inlet cone than a distance equal to the radius of the inlet opening through said housing.

References Cited
UNITED STATES PATENTS

| | | | |
|---|---|---|---|
| 2,452,274 | 10/1948 | Walters | 230—133 |
| 2,951,630 | 9/1960 | Murphy | 230—133 |
| 3,085,741 | 4/1961 | Burkhardt | 230—133 |
| 3,191,851 | 6/1965 | Wood | 230—133 |
| 3,221,983 | 12/1965 | Trickler et al. | 230—133 |
| 3,307,776 | 3/1967 | White | 230—133 |

FOREIGN PATENTS

| | | |
|---|---|---|
| 679,982 | 2/1964 | Canada. |
| 1,071,888 | 12/1959 | Germany. |

HENRY F. RADUAZO, Primary Examiner

U.S. Cl. X.R.

415—208